March 14, 1939.  J. B. NELSON  2,150,696
FILM WINDING MECHANISM
Filed Aug. 18, 1937
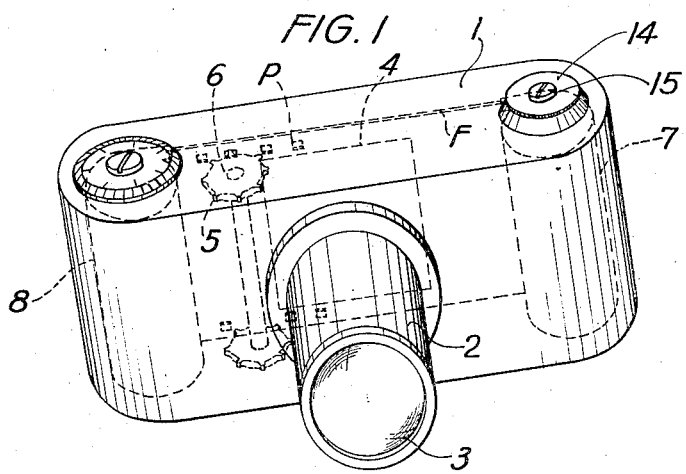
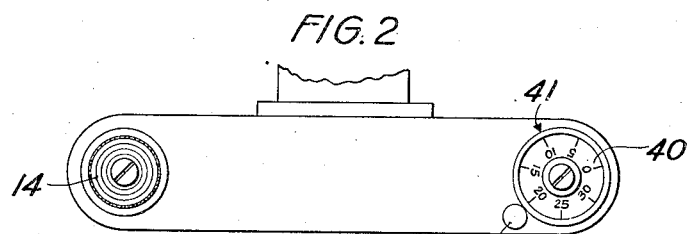
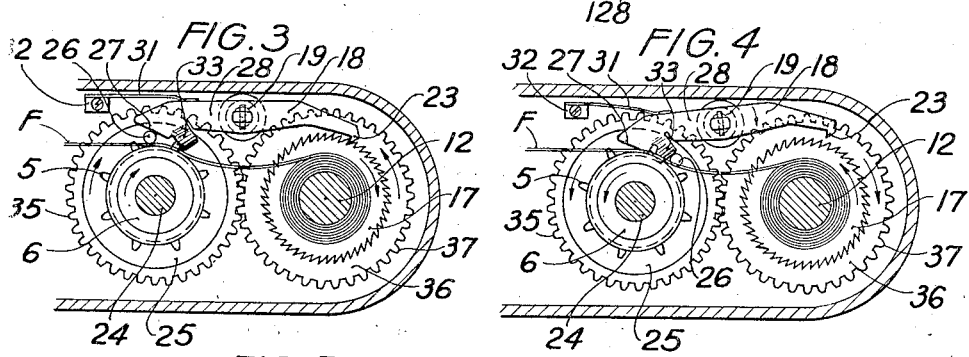
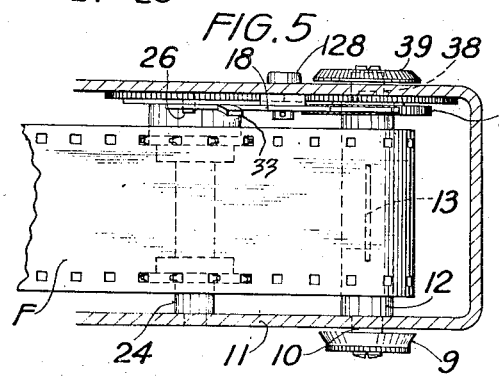
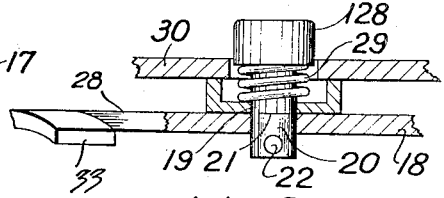
John B. Nelson
INVENTOR
BY
ATTORNEYS Patented Mar. 14, 1939

2,150,696

UNITED STATES PATENT OFFICE 2,150,696

FILM WINDING MECHANISM

John B. Nelson, Rochester, N. Y., assignor to Eastman Kodak Company, Rochester, N. Y., a corporation of New Jersey Application August 18, 1937, Serial No. 159,744

5 Claims. (Cl. 242—71)

This invention relates to photography and more particularly to roll film cameras.

One object of my invention is to provide a simple type of film winding and control and counter by which film may be wound through a camera without reference to exposure indicating numerals on backing paper. Another object of my invention is to provide a simple type of automatic film winding stop which will be thrown in when a fresh area of film is wound into place and which may be manually released when the area of film has been exposed. Another object of my invention is to provide a device in which film may be wound from a supply spool to a take-up spool for exposing the film and then may be wound back onto the original spool before removing it from the camera and to provide a structure which will permit this rewinding without attention from an operator. Another object of my invention is to provide a film counter which works in conjunction with the film winding mechanism, so that the number of exposures which have been made can be readily determined from the outside of the camera. Still other objects will appear from the following specification, the novel features being particularly pointed out in the claims at the end thereof.

Coming now to the drawing wherein like reference characters denote like parts throughout:

Fig. 1 is a perspective view of parts, shown schematically in broken lines, of a camera constructed in accordance with a preferred form of my invention.

Fig. 2 is a top plan view of the camera shown in Fig. 1, the objective carrier being broken away.

Fig. 3 is an enlarged detail section, parts being shown in elevation, of the film measuring and locking mechanism used in the camera shown in the preceding figures.

Fig. 4 is a view similar to Fig. 3 but with the parts in a winding position.

Fig. 5 is a detail section showing a plan view of the film winding, latching and measuring mechanism.

Fig. 6 is an enlarged fragmentary view of the winding latch release.

As a preferred form of my invention, I have shown a camera of the so-called miniature type adapted to take pictures on perforated motion picture film.

As indicated in Fig. 1, the camera may consist of a camera body 1 having an extending front tube 2 which carries the camera objective 3. Light passing through the objective and passing through an exposure frame 4 makes an image on a film F lying across the exposure frame. The film carries perforations P along the edge, these perforations being adapted to engage the teeth 5 of a sprocket 6. In the present embodiment of my invention I have made the diameter of the sprocket such that one revolution of the sprocket will permit one exposure area to pass across the exposure frame 4.

In this camera the supply of film may be carried by a spool or a retort 7 and the film is wound from this supply reel to a take-up reel 8 past the exposure aperture 4.

In order to wind film upon the take-up spool 8, there is a winding knob 9 shown in Fig. 5 attached to a shaft 10, passing through the camera casing 11, to rotate a spool or hub 12, including a slot 13 to which the end of the film F may be attached in threading the camera. Thus, when the winding knob 9 is turned, film is wound to the take-up chamber. After all of the exposures have been made, the film may be wound back into the original retort or onto the original spool 7 by means of a similar winding knob 14 on the opposite end of the camera, this knob being connected to a shaft 15 which is attached to the spool in any known manner.

Where motion picture film is used in cameras of this type, it is customary to omit the film backing paper, and consequently, it is necessary to omit the usual red window in the camera back. In order to measure off the exposed sections of film, the following mechanism is employed. Referring to Fig. 5, the hub 12 carries a ratchet 17 which turns with the hub and which lies in the path of a pawl 18 which is pivoted upon a shaft 19. This shaft, as best shown in Fig. 6, carries one or more flat portions 20, so that the pawl may rest against one or more shoulders 21, being held in place by means of a pin 22. The pawl 18 includes a hook-like member 23 on the end adapted to engage the ratchet 17 whenever the pawl moves in the direction shown by the arrow in Fig. 4. This movement is accomplished in the following manner:

As the film is wound from one roll to the other, it passes over a sprocket wheel 6 having teeth 5, this sprocket being carried by a shaft 24. The shaft 24 supports a toothed disk 25 which carries a pin 26.

Fig. 4 shows the parts in position for film to be wound upon the hub member 12. If the winding key 9 is turned to wind film on the hub, the film, by running over the sprocket 6, will turn the sprocket through the teeth 5. As the sprocket is moved, the pin 26 is likewise moved, passing through the position shown in Fig. 4 and continuing around until it strikes the slanting edge 27 of the pawl arm 28. Thus, the pin striking this arm of the pawl, throws the hook 23 into engagement with the ratchet 17, as indicated in Fig. 3, and locks the winding key 9 against further movement.

In order to release this latch after the film has been exposed, there is a push-button 128, as indicated in Fig. 6, which is spring-pressed outwardly by a spring 29 through the camera wall 30. This push-button is on the end of shaft 19 above described, on which the pawl 18 is pivotally mounted. By thrusting in on the push-button 128, the pawl is bodily moved by the shoulder 21 away from the pin 26 and is permitted to drop down over the end of the pin under the influence of the spring 31 attached to the camera at 32, as shown in Fig. 4. As soon as this movement occurs, the pawl 18 is immediately swung about its pivot 19 so that the hook 23 releases the ratchet. Winding the next area of film can then take place.

After all of the film areas have been exposed and it is desirable to wind the film back again into the retort 7, it is only necessary to turn the winding knob 14 to cause a reverse movement of the film. This movement will not be interrupted at any time by the pawl and ratchet for the following reason. Each time the pin 26 moves toward the pawl 18—when moving in the direction shown by the arrow in Fig. 4—it will pass under the upwardly beveled edge 33 of the pawl, causing a slight compression of spring 29 and permitting the pawl to rock idly over the end of the pin as it passes beneath the ratchet. Thus, continued winding on the winding handle 14 will wind the film back into the retort 7 while the pawl oscillates above the ratchet without ever being brought into engagement with the ratchet.

It is necessary to measure film and to indicate on the outside of the camera the number of exposures which have been made. To accomplish this, I have provided teeth 35 on the disk 25, these teeth meshing with a second gear 36. The teeth 37 of this gear can be made approximately the same in number as the teeth of gear 35, but preferably there is either one tooth more or one tooth less on the gear 36. A greater difference may be provided if desirable, the reason for this difference being that for each revolution of the gear 35, the gear 36 should move a distance either greater or less than one complete revolution, so that a dial and pointer can indicate the number of exposures. In the present instance, the gear 36 has one more tooth than the gear 35, so that at each revolution of the gear 35, the gear 36 will move a distance equal to one tooth further.

Gear 36 rides idly on the hub 12 and is attached to a stub shaft 38 to which is affixed a dial 39 equipped with a suitable scale 40, there being a pointer 41 on the camera. It is obvious that either the scale or the pointer may be attached to turn with the gear 36, but whichever part is mounted to move, the two will cooperate to indicate the number of exposures made. Thus, in Fig. 2 the scale and pointer indicate that ten exposures have been made.

The structure above described is relatively simple and forms a positive latch for winding the film, in which undue strain is not placed upon the film but the winding spool is definitely latched when a predetermined amount of film has been measured off. The measuring device as constructed in the preferred embodiment illustrated, forms a part of the latching mechanism since it forms a carrier for the pin 26 and since both of these gears are mounted to cooperate with the film winding mechanism, that is, gear 35 is fixedly carried by shaft 24 and gear 36 is freely rotatable about the axis of the winding hub 12.

The operation of this winding control is extremely simple. After having threaded the camera by stretching the film from the supply retort to the take-up spool and placing the apertures P of the film on the teeth 5 of the sprocket, it is only necessary to set the dial 40 until the zero mark appears opposite the pointer. This can be accomplished because any suitable form of friction connection can be used to attach the dial to the stub shaft 38. By winding the key 9, the film will be permitted to move until the pin 26 strikes the beveled surface 27 of the pawl 18, rocking it about its pivot 19 until the ratchet is engaged by the hook 23 of the pawl. This prevents further movement of the winding key 9 until the push-button 128 is released. After making an exposure, the operator depresses the push-button 128 so that the shaft 19 moves axially, displacing the pawl 18 and permitting spring 31 to move the pawl over the end of the pin 26 which will be in the position shown in Fig. 3. When the pawl has been moved by depressing the push-button 128, it will lie in the position shown in Fig. 4. By turning the winding key 9, the pin will move from the Fig. 3 to the Fig. 4 position and continue its movement until it again moves the pawl 18 against the pressure of spring 31 locking the film. These operations may be continued until all of the film has been used and it is desired to return the film into its original container.

To do this the winding handle 14 is turned so that the film will move in a reverse direction. This causes the gear 35 and the pin 26 to move in the direction shown by the arrow in Fig. 4, from which figure it will be seen that each time the pin approaches the pawl 18, it will ride under the upwardly beveled surface 33. This will merely cause the pawl to move axially on its shaft 19 and the hook 23 will remain out of engagement with the ratchet 17. By continuing to turn the handle 14, the film may be completely rewound.

What I claim as new and desire to secure by Letters Patent of the United States is:

1. In an automatic stop for perforated roll film cameras, the combination with supply and take up rolls, a sprocket over which the film passes, a ratchet on the take up roll, a pawl pivoted adjacent said ratchet, a spring tending to raise the pawl from the ratchet, and a pin carried by the sprocket adapted to positively thrust the pawl into engagement with the ratchet, and means for manually moving the pawl to render the pin on the sprocket inoperative.

2. In an automatic stop for perforated roll film cameras, the combination with supply and take up rolls, a sprocket over which the film passes, a ratchet on the take up roll, a pawl pivoted adjacent said ratchet, a spring tending to raise the pawl from the ratchet, a disk carried by the sprocket, a pin projecting therefrom and adapted to engage and force the pawl into the ratchet, a push button parallel to said pin for releasing the pawl therefrom whereby said spring may raise the pawl from the ratchet.

3. In an automatic stop for perforated roll film cameras, the combination with supply and take up rolls, a sprocket over which the film passes, a ratchet on the take up roll, a pawl pivoted adjacent said ratchet, a pivotal support for the pawl comprising an axially movable shaft, a spring tending to hold the shaft in an operative position, a second spring adapted to raise the pawl from the ratchet, a pin carried by the sprocket for positively engaging the pawl and ratchet, and means for releasing the pawl and ratchet manually by moving the pawl shaft axially whereby said second spring may cause the pawl to slip off the end of the sprocket pin.

4. In an automatic stop for perforated roll film cameras, the combination with supply and take up rolls, a sprocket over which the film passes, a ratchet on the take-up roll, a pawl pivoted adjacent said ratchet, a pivotal support for the pawl comprising an axially movable shaft, a spring tending to hold the shaft in an operative position, a second spring adapted to raise the pawl from the ratchet, a pin carried by the sprocket for positively engaging the pawl and ratchet, and means for releasing the pawl and ratchet manually by moving the pawl shaft axially whereby said second spring may cause the pawl to slip off the end of the sprocket pin, a beveled ear on the pawl lying in the path of the sprocket pin, means for rewinding the film onto the supply roll whereby said pawl may remain inoperative oscillating idly upon its pivot as the sprocket pin turns with the sprocket in a rewinding direction.

5. In an automatic stop for perforated roll film cameras, the combination with supply and take up rolls, a sprocket over which the film passes, a ratchet on the take up roll, a pawl pivoted adjacent said ratchet, a slidable pivot for the pawl, spring tension tending to move the pawl in two directions, in one direction away from the ratchet and in the other direction toward an operating pin, said operating pin being mounted to turn with said sprocket, the pawl including inclined surfaces and the pin being mounted for movement with the sprocket into engagement with one inclined surface so that said pin may definitely thrust the pawl and ratchet together when moving in a winding direction and so that said pin may idle behind the pawl passing under the other inclined surface when said pin is moving in a rewinding direction whereby film may be wound forward only intermittently and may be rewound without interruption.

JOHN B. NELSON.